(12) United States Patent
La Fata

(10) Patent No.: US 6,691,947 B2
(45) Date of Patent: Feb. 17, 2004

(54) REPETITIVE IMAGE TARGETING SYSTEM

(75) Inventor: Christopher M. La Fata, Florissant, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/096,722

(22) Filed: Mar. 12, 2002

(65) Prior Publication Data

US 2003/0183720 A1 Oct. 2, 2003

(51) Int. Cl.[7] .................. F42B 15/01; F41G 7/00; G01S 13/524; G01S 13/90
(52) U.S. Cl. ................. 244/3.19; 244/3.15; 342/25; 342/52; 342/58; 342/60; 342/61; 342/62; 342/63; 342/64; 342/159; 342/160; 342/195
(58) Field of Search .................. 244/3.1, 3.15, 244/3.16–3.22; 342/25, 60, 61, 62–65, 66, 52, 58, 89, 90, 159–169, 175, 176, 179, 195, 196, 197; 348/144, 416.1; 382/103

(56) References Cited

U.S. PATENT DOCUMENTS

| | | | | |
|---|---|---|---|---|
| 3,720,942 A | * | 3/1973 | Wilmot et al. | 342/90 |
| 4,267,562 A | * | 5/1981 | Raimondi | 348/144 |
| 4,825,213 A | * | 4/1989 | Smrek | 342/25 |
| 5,150,426 A | * | 9/1992 | Banh et al. | 342/90 |
| 5,260,709 A | * | 11/1993 | Nowakowski | 342/62 |
| 5,341,142 A | * | 8/1994 | Reis et al. | 342/64 |
| 5,430,445 A | * | 7/1995 | Peregrim et al. | 342/25 |
| 5,818,383 A | * | 10/1998 | Stockburger et al. | 342/161 |
| 5,945,937 A | * | 8/1999 | Fujimura | 342/25 |
| 5,946,041 A | * | 8/1999 | Morita | 348/416.1 |
| 6,185,314 B1 | * | 2/2001 | Crabtree et al. | 382/103 |

* cited by examiner

Primary Examiner—Bernarr E. Gregory
(74) Attorney, Agent, or Firm—Black Lowe & Graham PLLC

(57) ABSTRACT

The present invention includes a system and method for accurately locating moving targets. The system includes a targeting aircraft that has a radar system with a simultaneous SAR radar/moving target mode that generates an image and identifies moving targets in the generated image. The targeting aircraft also includes a mapping component that matches the generated image to a stored digital map, and generates moving target location information based on the matched image and map and the identified moving targets.

16 Claims, 5 Drawing Sheets

REPETITIVE IMAGE TARGETING SYSTEM

FIELD OF THE INVENTION

This invention relates generally to radar systems and, more specifically, to radar targeting systems.

BACKGROUND OF THE INVENTION

Modern-day strike fighters use Synthetic Aperture Radar (SAR)/Ground Moving Target Indication (GMTI) radar imaging systems to target and support engagement of moving ground targets.

Traditional SAR/GMTI radar imaging systems use separate radar GMTI mode data overlaid on SAR map mode image data. The resulting overlay may result in reduced moving target overlay accuracy. For example, moving targets may be portrayed offset from roads upon which the moving targets travel.

Typically, only one of many ground moving target indications can be tracked using known fighter aircraft Ground Moving Target Track (GMTT) modes. Known GMTT mode accuracies are sensitive to sensor bore-sight errors, radome induced errors, and inertial navigation data errors that corrupt line-of-sight targeting. The impact of these errors on the radar's ability to accurately track a ground moving target have historically degraded targeting accuracy beyond what is practical for the employment of low cost GPS aided weapons. As a result, modern-day strike fighters may experience reduced accuracy in targeting and supporting engagement of multiple ground moving targets through the weather in order to kill a majority of the moving targets.

Recently, a simultaneous SAR/GMTI mode active electronically scanned array (AESA) radar system has been introduced by The Raytheon Company. Raytheon's radar system provides a better overlay of moving target image data onto SAR map image. However, this system has difficulty generating moving target location information that would allow a self-guided weapon the greatest chance of success.

As a result, there is an unmet need in the art for an accurate moving target targeting system.

SUMMARY OF THE INVENTION

The present invention provides a highly accurate moving target locator system.

The present invention includes a system and method for accurately locating moving targets. The system includes a targeting aircraft that has a radar system with a simultaneous SAR radar/moving target mode that simultaneously collects data for generating a SAR map image and precisely locates detected moving targets within the SAR map image. The velocity and direction of detected moving targets are updated repeatedly during the SAR map data collection period needed to generate an image. The targeting aircraft also includes a mapping component that matches the generated image to a stored digital map image which has been preprocessed using an image mensuration process, and generates moving target location information based on the transfer of measured coordinates from the matched reference image and map to the detected moving targets.

In accordance with further aspects of the invention, the system also includes a strike aircraft with self-guided weapons that each have a unique identifier code. Each of the self-guided weapons includes a navigation system and an antenna for receiving moving targets information and weapon/target pairing codes from the targeting aircraft. Each weapon determines a course to an assigned target based on the sent moving targets information and the weapon/target pairing codes. Each of the self-guided weapons navigates according to the associated determined course.

In accordance with other aspects of the invention, each of the detected moving targets information includes moving target velocity and direction. The targeting aircraft sends the moving target velocity and direction updates to the weapons periodically during the map data collection period for each new map, and each weapon's navigation system determines the course to the assigned target further based on the sent periodic updates of moving target velocity and direction. Each set of moving targets updates includes weapon/target pairing codes that enable individual weapons to select the appropriate update information from the set of updates for their navigation system. The process of map data collection and target/weapon updating repeats continuously while weapons are in flight.

In accordance with still further aspects of the invention, the radar system is a four-channel active electronically scanned array radar system.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
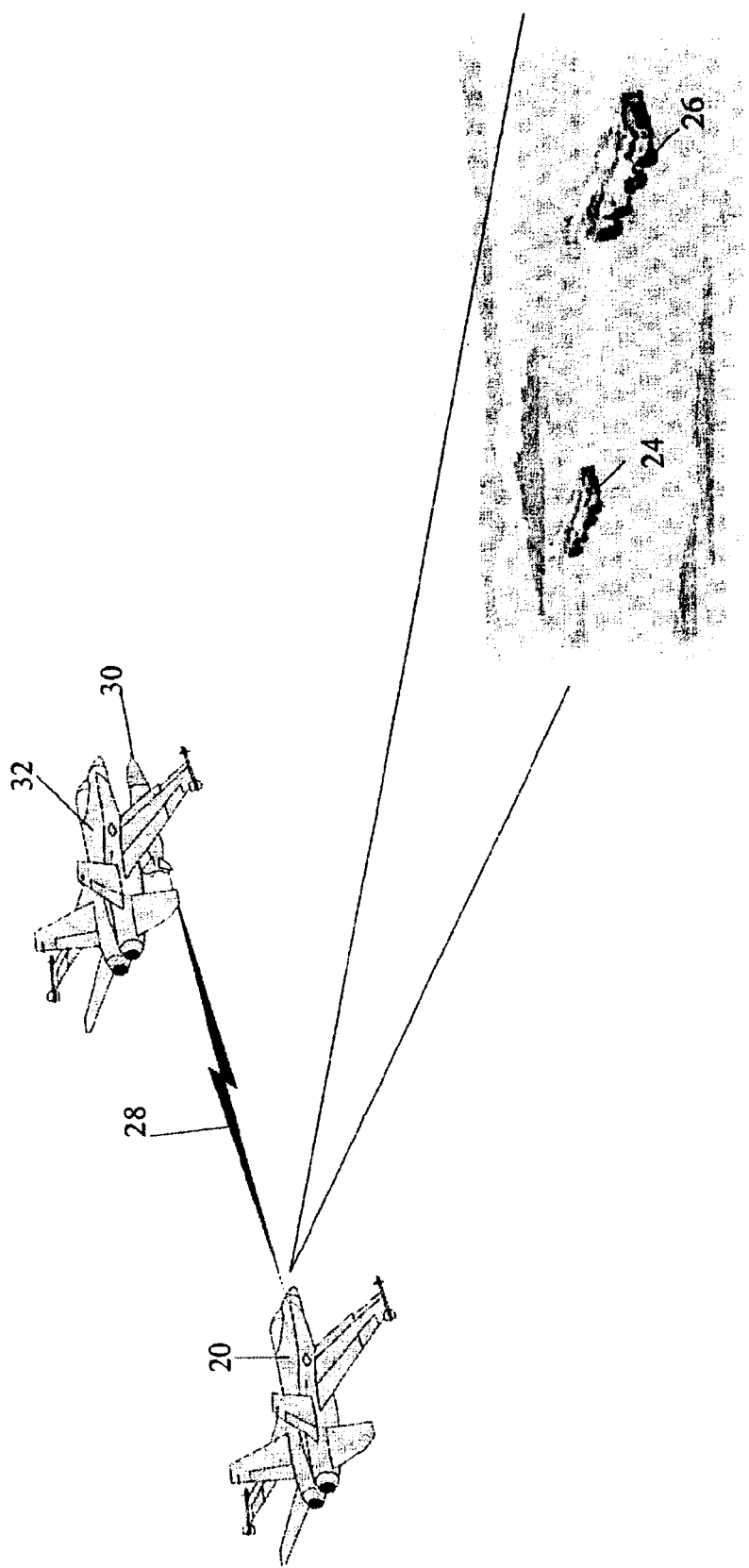
FIGS. 1 and 2 are illustrations of a situational environment for the present invention.

FIG. 1 illustrates an environment in which the present invention is implemented. A targeting platform 20, that is a modern-day strike fighter such as without limitation an F/18-E/F Super Hornet, radar scans an area for moving targets 24 and 26, generates accurate information of the moving targets 24 and 26 in the scanned area and supplies the accurate moving target information via a link 28 to weapons 30 and 31 on a weapons platform 32.

Figure 2:
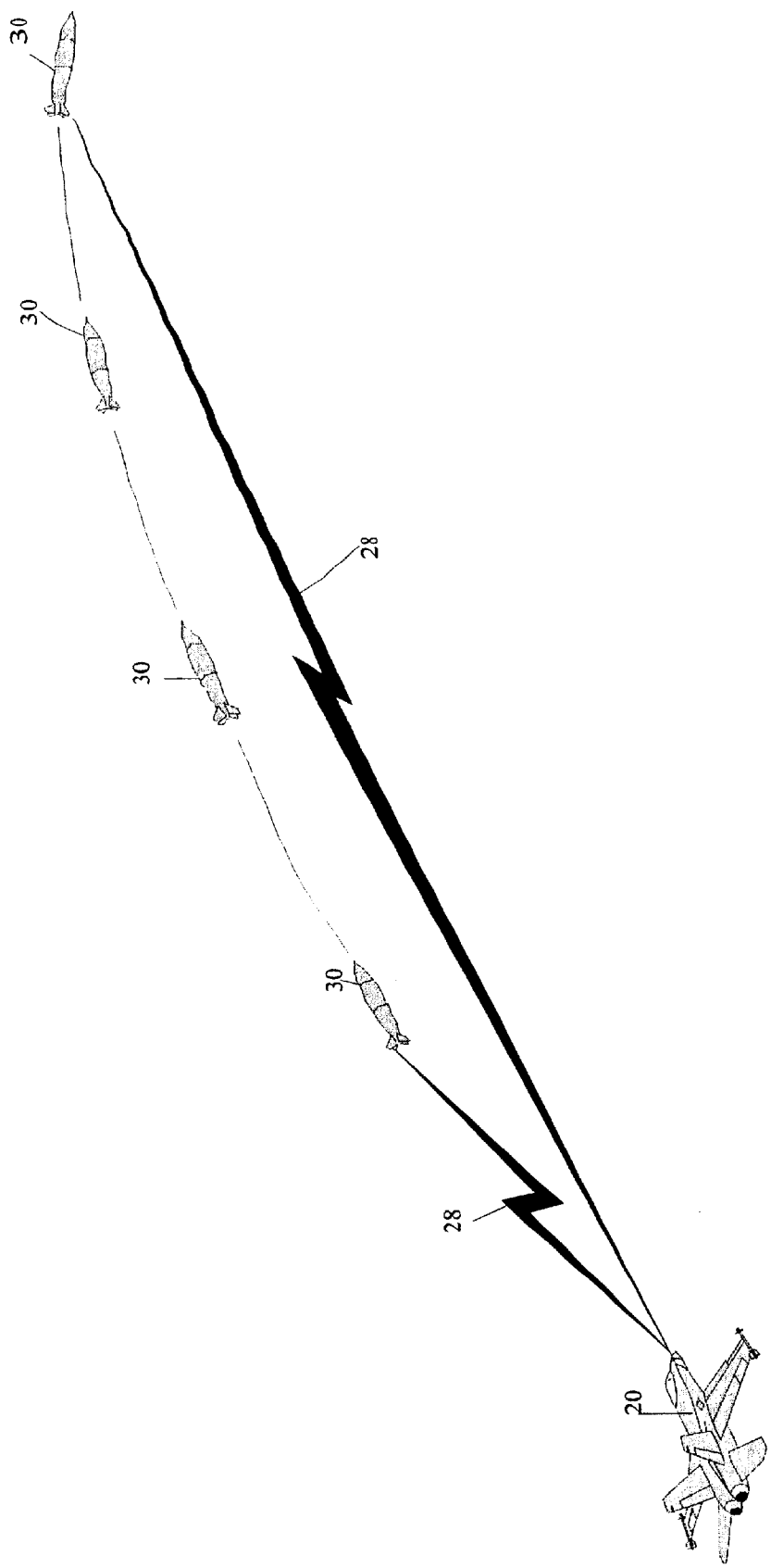

The link 28 suitably includes, without limitation, a radar data link, or an L-band link, such as a Multifunction Information Distribution System (MIDS) link. The weapons 30 and 31 include a receive-only antenna (not shown) that supplies received data to an internal navigation system (not shown). The radar system and processing components aboard the targeting platform 20 are described in more detail below with respect to FIGS. 3 and 4. As shown in FIG. 2, the targeting platform 20 continues to send accurate moving target information (position, velocity, and direction) to the weapons 30 and 31 after the weapon have been launched by the weapons platform 32. This allows the weapons 30 and 31 to update target navigation based on the updated moving target information.

Figure 3:
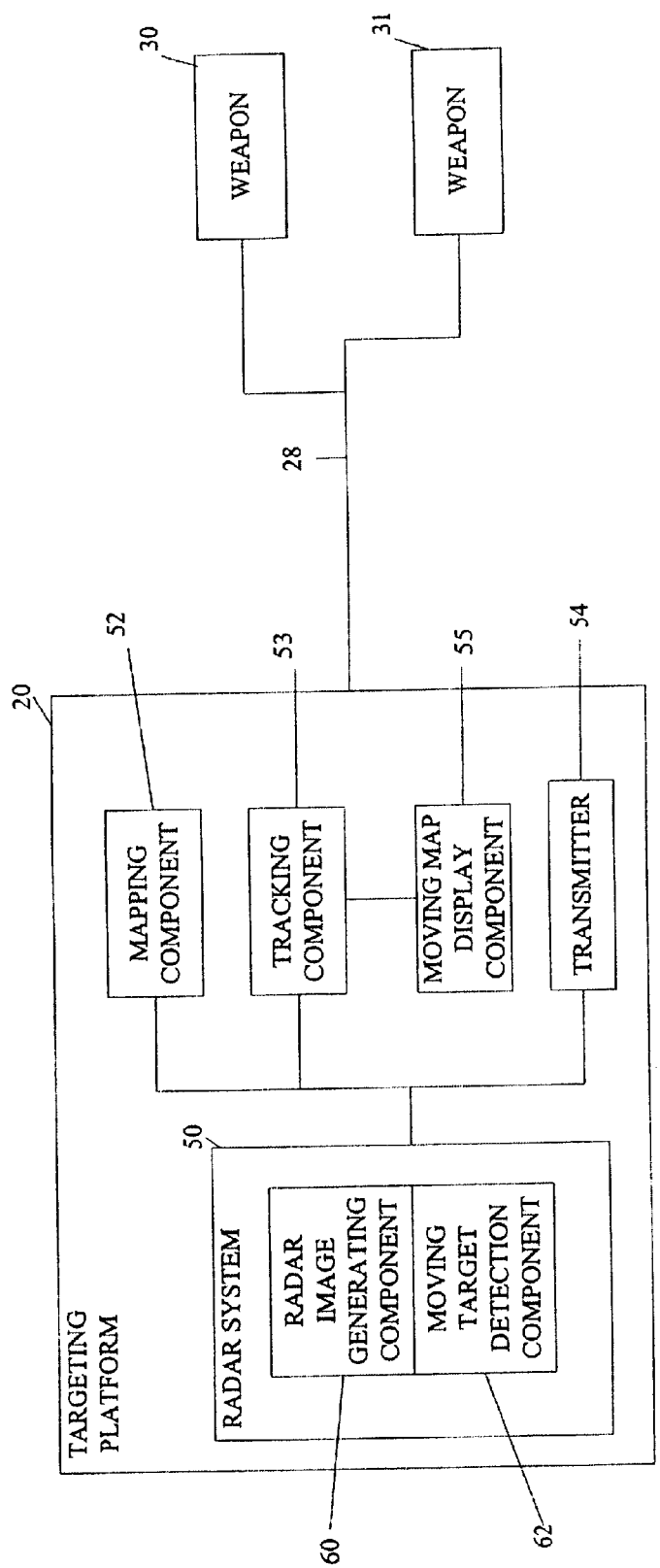
FIG. 3 is a block diagram of system components of the present invention.

FIG. 3 illustrates the components of the targeting platform 20 used to enable the scenarios shown in FIGS. 1 and 2. The targeting platform 20 includes a radar system 50, a mapping component 52, a tracking component 53, a transmitter 54, and a moving map display component 55. The radar system 50, the tracking component 53, and mapping component 52 are electrically coupled to each other and to the transmitter 54. The moving map display component 55 and the tracking component 53 are electrically coupled to each other. The radar system 50 includes a radar image generating component 60 and a moving target detecting component 62. The radar image generating component 60 generates a radar image from a radar return transmitted and received by a radar system antenna (not shown). The moving target detecting component 62 detects moving targets or objects included within the radar image data collected by the radar image generating component 60. The moving target component 62 also provides velocity and direction of movement information associated with each detected moving target or object to the tracking component 53, the transmitter 54, and the radar image generating component 60. An exemplary radar system 50 is a four channel active electronically scanned array (AESA) radar system that includes a simultaneous synthetic aperture radar (SAR)/ground moving target indication (GMTI) mode for generating the radar image and detecting moving targets. An example of a suitable AESA radar system with simultaneous SAR/GMTI mode is a solid state radar system model number AN/APG-79 produced by The Raytheon Company.

The data produced by the radar system 50 includes a radar image and moving target information (i.e., target velocity, direction of travel). The mapping component 52 receives the generated radar image from the radar system 50 and matches the radar image with a stored digital image that is retrieved based on a location value (latitude/longitude) included within the generated radar image. After the mapping component 52 has matched the radar image with the stored digital image, the mapping component 52 accurately identifies the location of each identified moving target. Then, the generated moving target information is sent to the transmitter 54. The transmitter 54 also receives moving target velocity and direction information from the radar system 50. Then, the transmitter 54 transmits the target location information, target velocity, and target direction to the weapons 30 and 31 via the link 28. A non-limiting example of a suitable transmitter includes a MIDs antenna or a Link-16 network antenna.

The radar image generating component 60 automatically selects image center location, resolution, and coverage area for the next generated radar image based upon current ground moving target information, previous matching of the radar image to the stored digital image, and data link requirements between the targeting platform 20 and the weapon 30.

In one embodiment, the mapping component 52 uses world geodetic survey data (WGS) as the stored digital image used in the matching process. Suitable examples of systems that perform the matching function performed by the mapping component 52 include an edge based matcher, such as a Digital Precision Strike Suite (DPSS) system produced for the U.S. Navy, or a Photogrametry system produced by The Harris Corporation.

Figure 4A:
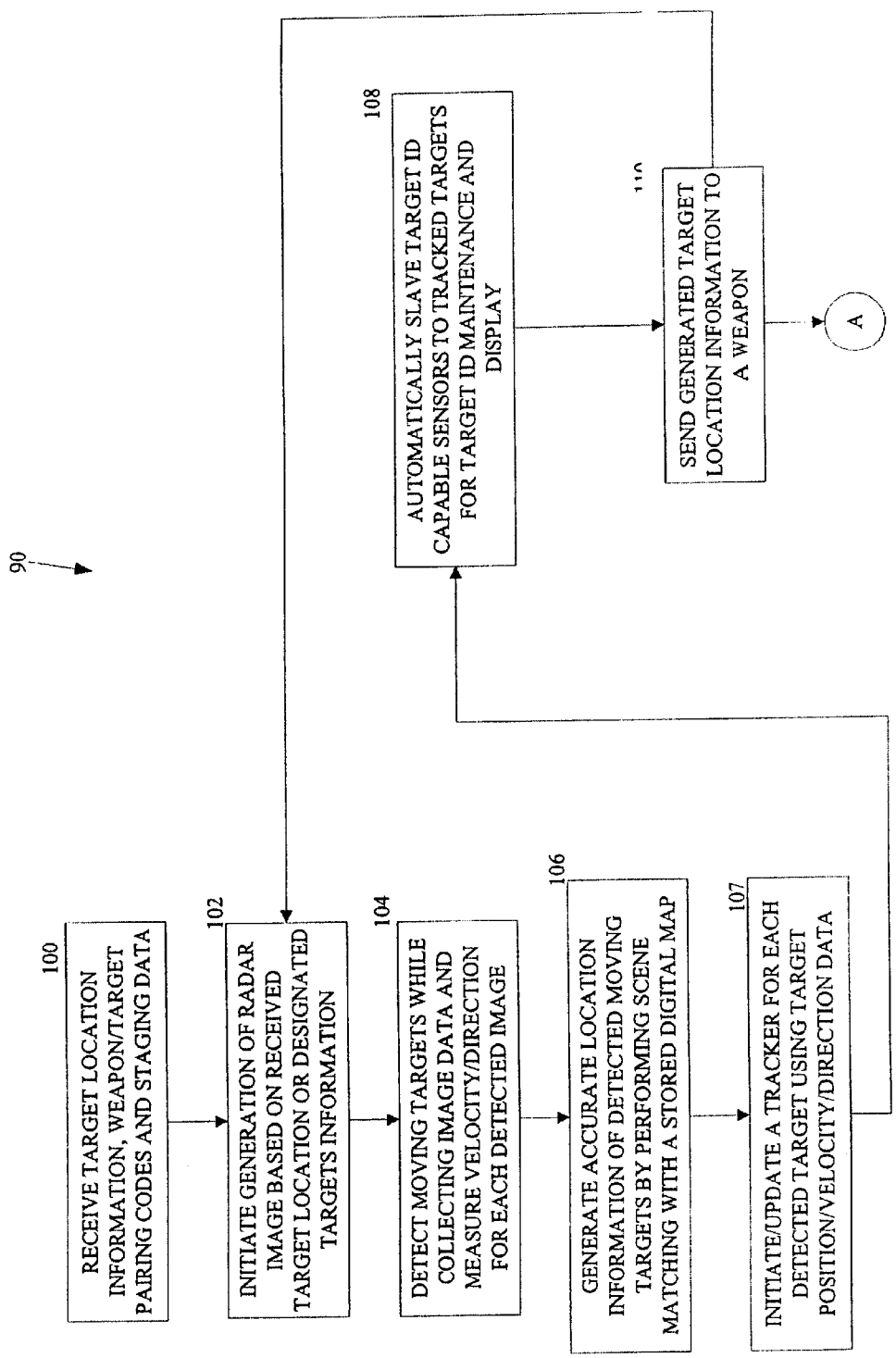
FIGS. 4A and B illustrate a flow diagram of a process shown in FIGS. 1 and 2 as executed by the components shown in FIG. 3.
Figure 4B:
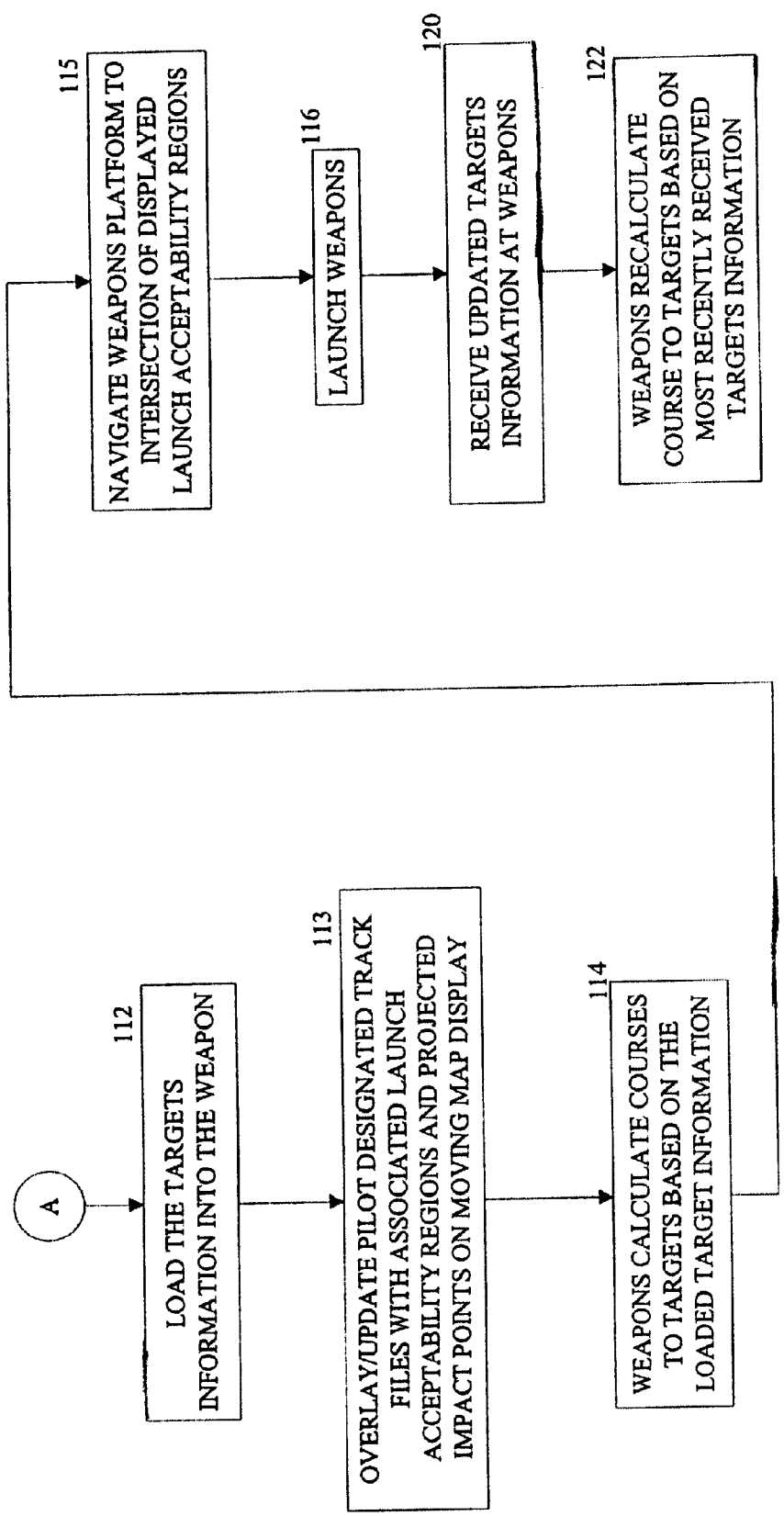

FIGS. 4A and B illustrate a flow diagram showing a non-limiting example of a process 90 performed by the targeting platform 20 from FIG. 3. First, at block 100, the targeting platform receives target location, weapon/target pairing codes and weapons platform staging information. This step is suitably performed by uploading information prior to launch or receiving information from various other platforms, such as airborne, ground-based, sea-borne, or satellite radar system platforms. Next, at block 102, the targeting platform's radar system 50 initiates radar image data collection based on the received target location information or on existing designated targets' locations. The radar image data is collected so that the center pixel location in the resulting image is approximately at the received target location or is located so that existing designated targets are captured within the image field of regard. At block 104, the moving target detecting component 62 simultaneously and repeatedly detects any moving targets within the collected radar image data as it is collected in preparation for map image generation. Each detected moving target or object is associated with a pixel location within the generated map image data. Then, at block 106, the mapping component 52 generates accurate location information of detected moving targets by performing matching of the generated radar image with a stored digital map that has been previously processed using an image mensuration process, and determining where the moving targets are located.

At block 107, a tracker is initiated for each detected moving target using the target's velocity, velocity, and direction information. At block 108, available platform sensors that are capable of facilitating target identification are slaved to capture images of the detected moving targets or objects. At block 110, the transmitter 54 sends the generated target location information to weapons 30 and 31. The target information is preferably delivered by a radar data link, or L-band link, such as a Multifunction Information Distribution System (MIDS) link, directly to the weapons 30 and 31. At block 112 the weapons 30 and 31, such as without limitation a Joint Defense/Direct Attack Munitions (JDAM) or Joint Stand Off Weapon (JSOW), or the like, loads the target location information into the weapon's navigation system. The generated target location information is also sent back to the step at block 102 for use in generation of the next radar image. At block 113, targeting platform's pilot designated track files are overlaid/updated with associated launch acceptability regions and projected impact points on moving map display. Next, at block 114, the weapon's navigation system calculates course to the target based on the loaded target information. At block 115, the weapons platform navigates for intersection with displayed launch acceptability regions. At block 116, the platform holding the weapons launches the weapons 30 and 31 in any acceptable known manner. Next, at block 120, the weapons 30 and 31 receive updated target information from the transmitter 54 of the targeting platform 20. At block 122, the weapons 30 and 31 recalculate course to target based on the most recently received target information. Finally, the weapons 30 and 31 continue to receive updated target information from the targeting platform 20 and recalculates course based on the updated target information until impact with target.

In one non-limiting embodiment, the targeting platform 20 generates target location information (that information generated by the mapping component 52) at a slower rate than the generation of target velocity and direction information (that information generated by the moving target detecting component 62). In order to allow the weapons 30 and 31 to calculate the best possible impact point, the target location information and the target velocity and direction information are transmitted to the weapons 30 and 31 as soon as they are generated. The weapon's navigation system performs impact point and guidance calculations based on the most recently received information. If the most recently received information is target velocity and direction information, the weapon's navigation system calculates impact point and guidance information based on the recently received target velocity and direction information and the last received target location information.

In an alternate non-limiting embodiment, the target information is delivered by a Link-16 network link to the weapons platform 32 before weapon launch. The weapons platform 32 uses the target information to calculate and display weapons launch acceptability regions before release. The weapons platform 32 can also receive target radar images from the targeting platform 20 and display the received target radar images. Also, before release of the weapon 30 the weapons platform 32 transmits the position, altitude, and speed of the weapons platform 32 to the targeting platform 20. The targeting platform 20 computes and displays a projected impact point of the weapons 30 and 31 based on the target information and the position, altitude, and speed of the weapons platform 32.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for locating a moving target, the method comprising:

generating an image and identifying a moving target in the generated image;

matching the generated image to a stored digital map;

generating moving target location information based on the matched image and the stored digital map and the identified moving target;

sending the generated moving target location information to a self-guided weapon; and determining a course to the moving target based on the sent moving target location information.

2. The method of claim 1, further comprising navigating the weapon according to the determined course.

3. The method of claim 1, wherein sending the generated moving target location information includes wirelessly transmitting the moving target location information.

4. The method of claim 1, wherein identifying the moving target includes detecting moving target velocity and direction.

5. The method of claim 4, wherein sending the generated moving target location information further includes sending the identified moving target velocity and direction, and determining the course to the moving target is further based on the sent moving target velocity and direction.

6. The method of claim 1, wherein generating the image and detecting moving target information is performed by an active electronically scanned array.

7. A moving target locator system comprising:

a radar system including:

a component for generating an image and identifying a moving target in the generated image;

a mapping component for matching the generated image to a stored digital map, and generating moving target location information based on the matched image and map and the identified moving target; and a self-guided weapon including a navigation system and an antenna, wherein the radar system further includes a transmitter for sending the generated moving target location information to the self-guided weapon, and wherein the navigation system determines a course to the moving target based on the sent moving target location information.

8. The system of claim 7, wherein the self-guided weapon navigates according to the determined course.

9. The system of claim 7, wherein the transmitter is a wireless transmitter.

10. The system of claim 7, wherein the identified moving target location information includes moving target velocity and direction.

11. The system of claim 10, wherein the transmitter further sends the moving target velocity and direction, and the navigation system determines the course to the moving target further based on the sent moving target velocity and direction.

12. The system of claim 7, wherein the radar system is an active electronically scanned array radar system.

13. A moving target locator system comprising:

a self-guided weapon including a navigation system and an antenna; and a radar system including:

a component for generating an image and identifying a moving target in the generated image; and a mapping component for matching the generated image to a stored digital map, and generating moving target location information based on the matched image and map and the identified moving target, a transmitter for sending the generated moving target location information to the self-guided weapon, and wherein the navigation system determines a course to the moving target based on the sent moving target location information, wherein the identified moving target location information includes moving target velocity and direction, and wherein the radar system is an active electronically scanned array radar system.

14. The system of claim 13, wherein the transmitter further sends the moving target velocity and direction, and the navigation system determines the course to the moving target further based on the sent moving target velocity and direction.

15. The system of claim 14, wherein the self-guided weapon navigates according to the determined course.

16. The system of claim 15, wherein the transmitter is a wireless transmitter.

* * * * *